United States Patent
Miller

(10) Patent No.: US 6,565,445 B1
(45) Date of Patent: May 20, 2003

(54) TORSIONAL VIBRATION DAMPENING ASSEMBLY

(75) Inventor: Jeffrey E. Miller, Auburn, IN (US)

(73) Assignee: Auburn Clutch Co., Inc., Garrett, IN (US)

( * ) Notice: Subject to any disclaimer, the term of this patent is extended or adjusted under 35 U.S.C. 154(b) by 0 days.

(21) Appl. No.: 09/878,763

(22) Filed: Jun. 11, 2001

(51) Int. Cl.[7] .................................................. F16D 3/14
(52) U.S. Cl. .......................................... 464/64; 192/203
(58) Field of Search ............................ 464/68, 89, 64; 267/166, 169, 174; 192/203, 209, 210, 210.1, 211

(56) References Cited

U.S. PATENT DOCUMENTS

| | | | |
|---|---|---|---|
| 2,321,941 A | * 6/1943 | Rose | 464/68 |
| 2,513,379 A | * 7/1950 | Thelander | 464/68 X |
| 2,674,863 A | * 4/1954 | Thelander | 464/68 |
| 3,791,170 A | * 2/1974 | Schmidt | 464/69 |
| 4,093,054 A | * 6/1978 | Johns | 192/209 X |
| 4,197,931 A | * 4/1980 | Norcia | 192/203 |
| 4,646,899 A | * 3/1987 | Murakami | 192/209 |
| 4,693,354 A | * 9/1987 | Umeyama et al. | 192/210.1 X |
| 4,743,217 A | * 5/1988 | Tojima et al. | 464/64 X |
| 4,765,642 A | * 8/1988 | Struzina | 280/656 |
| 4,789,375 A | 12/1988 | Bassett | |
| 4,890,712 A | * 1/1990 | Maucher et al. | 464/68 X |
| 4,991,827 A | * 2/1991 | Taylor | |
| 5,099,973 A | 3/1992 | Flotow et al. | |
| 5,203,750 A | 4/1993 | Oster | |
| 5,273,372 A | * 12/1993 | Friedmann et al. | 464/24 |
| 5,370,581 A | * 12/1994 | Rohrle et al. | 464/89 X |
| 5,377,796 A | * 1/1995 | Friedmann et al. | 464/68 X |
| 5,657,845 A | 8/1997 | Szadkowski et al. | |
| 5,735,747 A | 4/1998 | Gehrke | |
| 5,860,889 A | 1/1999 | Schlosser | |
| 5,951,402 A | 9/1999 | Baldwin | |
| 6,332,843 B1 | * 12/2001 | Hashimoto ey al. | 464/64 X |

FOREIGN PATENT DOCUMENTS

GB 589989 * 7/1947 .................. 464/64

* cited by examiner

*Primary Examiner*—Greg Binda
(74) *Attorney, Agent, or Firm*—MacMillan, Sobanski & Todd, LLC

(57) ABSTRACT

A torsional vibration dampening assembly includes a hub having a radially outwardly extending flange with a plurality of openings formed therethrough. A pair of cover plates are supported on the hub for rotation relative thereto, each having a corresponding plurality of openings formed therethrough. A first stage vibration damper, including an annular central damper element having inner and outer rings secured thereto, extends between the second cover plate and the hub. A second stage vibration damper includes a spring damper assembly provided in each of the openings. Each of the spring damper assemblies includes a coiled spring having ends that react against first and second end caps. A movement restraining structure is provided for restraining the end caps from moving freely relative to one another under the urging of the spring. A hollow cylindrical isolation sleeve is disposed about each of the springs. The isolation sleeves prevent the springs from directly engaging the first and second cover plates and the hub during use, thus lowering the amount of noise that is generated during use of the torsional vibration dampening assembly.

11 Claims, 3 Drawing Sheets

TORSIONAL VIBRATION DAMPENING ASSEMBLY

BACKGROUND OF THE INVENTION

This invention relates in general to coupling devices for connecting first and second members together for concurrent rotation. In particular, this invention relates to an improved structure for a torsional vibration dampening assembly for use either as a direct coupling between such first and second members or as a driven disc assembly in a clutch for selectively connecting such first and second members.

Rotational coupling devices are structures that are adapted to connect first and second members together for concurrent rotation. For example, in the context of a vehicle drive train system, a rotational coupling device can be used to connect a source of rotational power, such as a flywheel that is secured to an engine driven crankshaft, to a rotatably driven device, such as an input shaft of a transmission. In some instances, the rotational coupling device provides a direct connection between the two members such that the flywheel constantly rotatably drives the input shaft of the transmission. In other instances, the rotational coupling device is provided within a clutch that selectively connects the two members such that the flywheel intermittently rotatably drives the input shaft of the transmission.

In such a vehicle drive train system, it is known that relatively high frequency torsional vibrations can be transmitted from the engine through the rotational coupling device to the transmission and other components of the drive train system. Such torsional vibrations can generate undesirable noise. To prevent or minimize this from occurring, it is often desirable to provide the rotational coupling device with a torsional vibration dampening assembly. The torsional vibration dampening assembly is adapted to reduce the magnitude of torsional vibrations that are transmitted through the rotational coupling device from the flywheel to the input shaft of the transmission.

To accomplish this, a typical torsional vibration dampening assembly includes two rotary torque transmitting elements that are rotatable relative to one another throughout a limited angular distance. The two rotary torque transmitting elements are connected together by a lost motion connection and by a spring damper drive. The lost motion connection is utilized to establish a positive driving connection between the two rotary torque transmitting elements, while permitting a limited range of free movement therebetween. The spring damper drive is utilized to establish a resilient driving connection between the two rotary torque transmitting elements within the limited range of free movement permitted by the lost motion connection. The spring damper drive can also be utilized to tune the vehicle drive train system so as to prevent or minimize vibrations from occurring therein within the operating speed range of the engine.

Although known torsional vibration dampening assemblies have functioned satisfactorily, it has been found that the torsional vibrations from the engine can still be transmitted from the engine to the transmission and other components of the drive train system, generating undesirable noise. Thus, it would be desirable to provide an improved structure for a torsional vibration dampening assembly that provides better vibration isolation and, consequently, reduces the amount of noise that is generated during use.

SUMMARY OF THE INVENTION

This invention relates to an improved structure for a torsional vibration dampening assembly for use in a rotational coupling device, such as in a vehicle drive train system. The torsional vibration dampening assembly includes a hub having a radially outwardly extending flange. A plurality of openings are formed through the annular flange. A pair of cover plates are supported on the hub for rotation relative thereto. Each of the cover plates has a plurality of openings formed therethrough that correspond in number and location to the openings formed through the annular flange of the hub. A first stage vibration damper extends between the second cover plate and the hub. The first stage vibration damper includes an annular central damper element having inner and outer rings secured thereto. A second stage vibration damper includes a spring damper assembly that is provided in each of the openings formed through the flange of the hub and the first and second cover plates. Each of the spring damper assemblies includes a resilient member, such a coiled spring, having ends that react against first and second end caps. A movement restraining structure is provided for restraining the end caps from moving freely relative to one another under the urging of the spring. A hollow cylindrical isolation sleeve is disposed about the spring and extends axially between the end caps. The isolation sleeve prevents the spring from directly engaging the sides of the openings formed through the first and second cover plates, respectively, and the sides of the opening formed through the flange of the hub during use. As a result, metal to metal contact therebetween is prevented, thus lowering the amount of noise that is generated during use of the torsional vibration dampening assembly.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
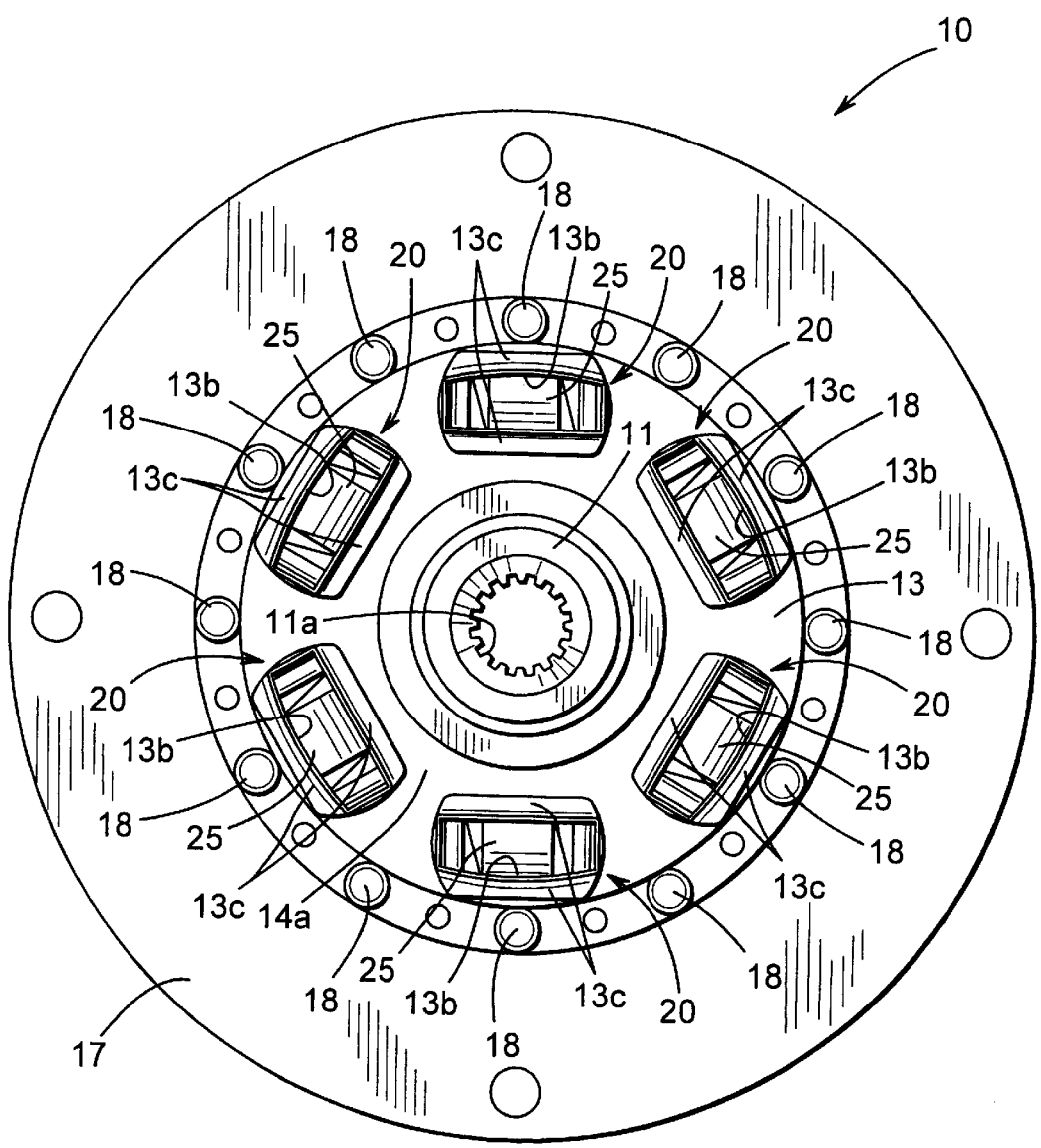
FIG. 1 is front elevational view of a torsional vibration dampening assembly in accordance with this invention.

Referring now to the drawings, there is illustrated a torsional vibration dampening assembly, indicated generally at 10, in accordance with this invention. The torsional vibration dampening assembly 10 can be provided as a stand alone rotational coupling device that can, as described above, be connected directly between two rotatable members, such as a flywheel (not shown) and an input shaft (not shown) of a transmission in a vehicle drive train system. Alternatively, as also described above, the torsional vibration dampening assembly 10 can be provided as a driven disc assembly in a clutch (not shown) for selectively connecting the flywheel to the input shaft of the transmission in the vehicle drive train system.

Figure 2:
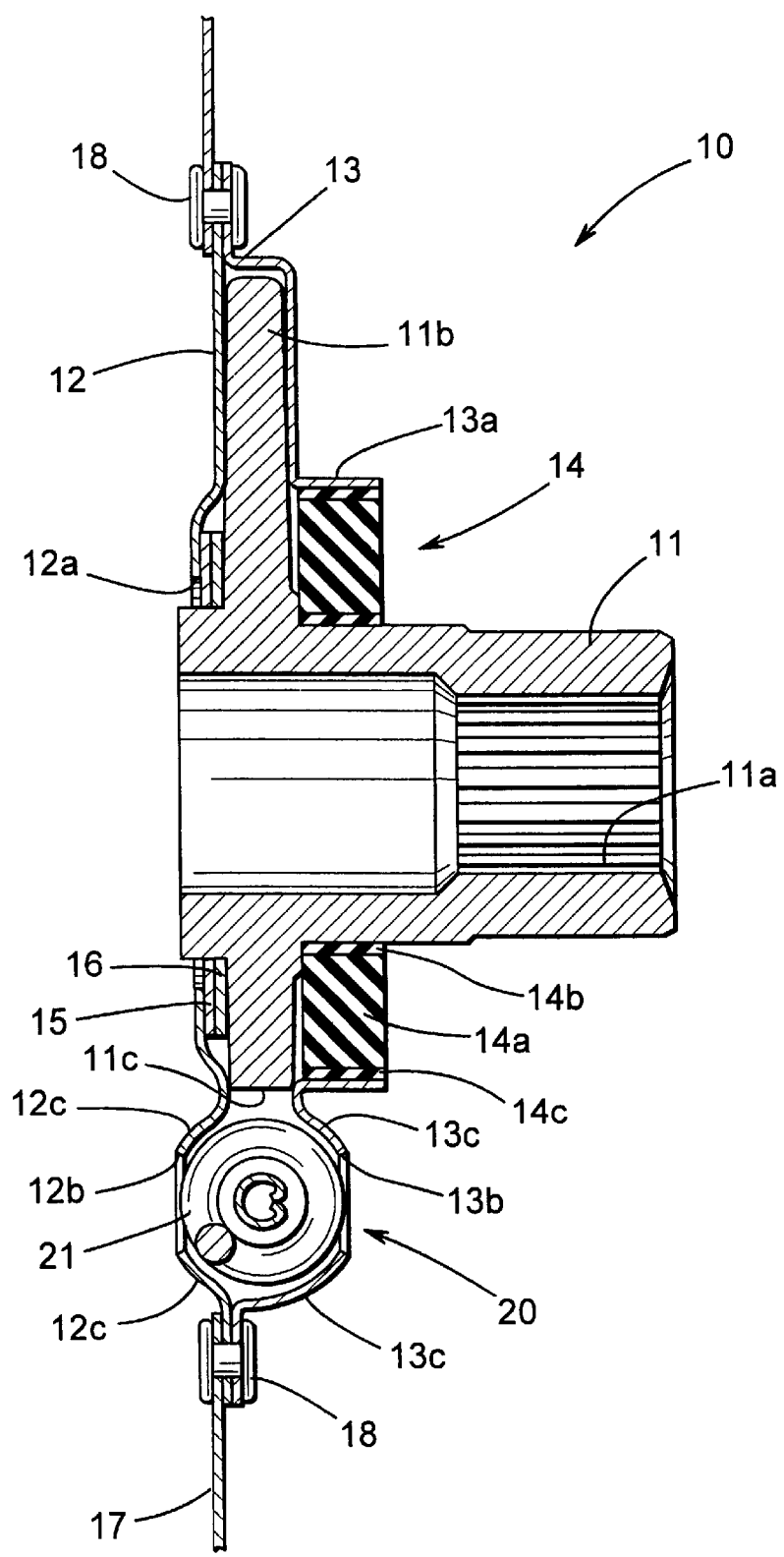
FIG. 2 is an enlarged sectional elevational view of a portion of the torsional vibration dampening assembly illustrated in FIG. 1.

As best shown in FIG. 2, the first rotary torque transmitting element of the torsional vibration dampening assembly 10 is embodied as a generally hollow cylindrical hub 11. The hub 11 has an inner surface having a plurality of longitudinally extending splines 11a or other similar structures formed therein. As is well known, the hub 11 is adapted to be supported on a shaft (not shown) that, as mentioned above, can be embodied as the input shaft to the transmission. The shaft upon which the torsional vibration dampening assembly 10 is mounted preferably has a plurality of splines or other similar structures formed thereon that cooperate with the splines 11a provided on the inner surface of the hub 11. Thus, the torsional vibration dampening assembly 10 is connected to such shaft for concurrent rotation. The hub 11 further includes an annular flange 11b that extends radially outwardly from the hub 11 and, in the illustrated embodiment, is formed integrally therewith. A plurality of openings 11c are formed through the annular flange 11b. In the illustrated embodiment, six equidistantly spaced openings 11c are formed through the flange 11b, although any desired number of such openings 11c may be formed at any locations. The purpose for such openings 11c will be explained below.

The second rotary torque transmitting element of the torsional vibration dampening assembly 10 is embodied as a pair of cover plates 12 and 13 that are supported on the hub 11 for rotation relative thereto. The first cover plate 12 is generally flat and annular in shape, having a central aperture 12a formed therethrough. As a result, a first portion of the hub 11 (located on the left axial side of the flange 11b when viewing FIG. 2) can extend through the central aperture 12a of the first cover plate 12, with a relatively small amount of radial clearance being provided therebetween. A plurality of openings 12b are formed through the first cover plate 12. In the illustrated embodiment, six equidistantly spaced openings 12b are formed through the first cover plate 12, although any desired number of such openings 12b may be formed at any locations. Preferably, the openings 12b formed through the first cover plate 12 correspond in number and location to the openings 11c formed through the annular flange 11b of the hub 11, as described above. If desired, portions of the first cover plate 12 extending about portions of the openings 12b may be angled outwardly in a first axial direction (toward the left when viewing FIG. 2), such as shown at 12c. The purpose for such angled portions 12c will be explained below.

Similarly, the second cover plate 13 is also generally flat and annular in shape. However, the second cover plate 13 has a hollow cylindrical flange 13a that extends axially therefrom. As a result, a second portion of the hub 11 (located on the right axial side of the flange 11b when viewing FIG. 2) can extend through the axially extending flange 13a of the second cover plate 13, with a relatively large amount of radial clearance being provided therebetween. A plurality of openings 13b are formed through the second cover plate 13. In the illustrated embodiment, six equidistantly spaced openings 13b are formed through the second cover plate 13, although any desired number of such openings 13b may be formed at any locations. Preferably, however, the openings 13b formed through the second cover plate 13 correspond in number and location to the openings 11c formed through the annular flange 11b of the hub 11 and to the openings 12b formed through the first cover plate 12, as described above. If desired, portions of the second cover plate 13 extending about each of the openings 13b may be angled outwardly in a second axial direction (toward the right when viewing FIG. 2), such as shown at 13c. The purpose for such angled portions 13c will also be explained below.

A first stage vibration damper, indicated generally at 14, extends between the axially extending flange 13b of the second cover plate 13 and the second portion of the hub 11. In the illustrated embodiment, the first stage vibration damper 14 includes an annular central damper element 14a having an inner ring 14b and an outer ring 14c secured thereto. Preferably, the central damper element 14a is formed from a material that is relatively resilient, such as an elastomeric material (rubber, for example). The inner and outer rings 14b and 14c are preferably formed from a relatively wear-resistant material, such as steel. The inner and outer rings 14b and 14c can be bonded or otherwise secured to the central damper element 14a to form the first stage vibration damper 14. The first stage vibration damper 14 can be press fit or otherwise secured to or disposed between the axially extending flange 13b of the second cover plate 13 and the second portion of the hub 11. The operation of the first stage vibration damper 14 will be explained below.

If desired, a wave washer 15 and a friction washer 16 (see FIG. 2) may be provided about the first portion of the hub 11 between the first cover plate 12 and the flange 11b. The wave washer 15 and the friction washer 16 are conventional in the art and form no part of this invention. An annular friction disc 17 is secured to the first and second cover plates 12 and 13 for concurrent rotation. In the illustrated embodiment, the friction disc 17 is secured to the first and second cover plates 12 and 13 by a plurality of rivets 18, although any known securement mechanism can be used. As is well known, the friction disc 17 can either be connected directly to the flywheel or can be selectively frictionally engaged between the flywheel and the pressure plate in a clutch in the vehicle drive train system.

The torsional vibration dampening assembly 10 further includes a second stage vibration damper. In the illustrated embodiment, the second stage vibration damper includes a spring damper assembly, indicated generally at 20, that is provided in each of the openings 11c formed through the flange 11b of the hub 11. The structure of one of the spring damper assemblies 20 is illustrated in detail in FIG. 3. As shown therein, the illustrated spring damper assembly 20 includes a resilient member, such a coiled spring 21, having ends that react against first and second end caps, indicated generally at 22 and 23, respectively. Each of the end caps 22 and 23 has an enlarged head portion 22a and 23a that facilitates engagement by the associated end of the spring 21 so as to urge the end caps 22 and 23 outwardly apart from one another. Each of the end caps 22 and 23 further includes a hollow shank portion 22b and 23b that extends within and supports the associated ends of the spring 21 so as to maintain co-axial alignment during use.

A movement restraining structure is provided for restraining the end caps 22 and 23 from moving freely relative to one another under the urging of the spring 21. In the illustrated embodiment, this movement restraining structure is embodied as a resilient spring sleeve 24 that extends between the end caps 22 and 23, although any other structure that performs this function can be used. In the illustrated embodiment, the spring sleeve 24 is formed from a flat piece of a flexible material, such a metallic material, that is rolled into the general shape of a hollow cylinder such that the opposed edges of the spring sleeve 24 extend longitudinally adjacent to one another. If desired, such opposed edges may be formed having inwardly extending flanges (not shown) to increase the lateral strength thereof. Regardless, however, the spring sleeve 24 is generally C-shaped, and the opposed ends thereof extend within and frictionally engage the interiors of the hollow shank portions 22b and 23b of the end caps 22 and 23, respectively. Thus, relative axial movement of the end caps 22 and 23 under the urging of the spring 21 is inhibited, but not prevented, by the frictional engagement of the spring sleeve 24 with the end caps 22 and 23.

Lastly, the spring damper assembly 20 includes a hollow cylindrical isolation sleeve 25 that is disposed about the spring 21 and extends axially between the end caps 22 and 23. The isolation sleeve 25 is provided to prevent the spring 21 from directly engaging the sides of the openings 12b and 13b formed through the first and second cover plates 12 and 13, respectively, and the sides of the opening 11c formed through the flange 11b of the hub 11 during use. Such direct engagement can occur, for example, when relatively high frequency torsional vibrations are transmitted from the engine through the torsional vibration dampening assembly 10 to the transmission and other components of the drive train system and can result in the generation of undesirable noise. The isolation sleeve 25 prevents this direct engagement from occurring and, therefore, reduces the amount of such noise. Preferably, the isolation sleeve 25 is formed from a relatively durable, low friction material, such as nylon (which is available under the brand name of Zytel from E. I. duPont de Nemours and Company.

As mentioned above, portions 12c of the first cover plate 12 extending about portions of the openings 12b are angled outwardly in a first axial direction (toward the left when viewing FIG. 2), and portions 13c of the second cover plate 13 extending about portions of the openings 13b are angled outwardly in a second axial direction (toward the right when viewing FIG. 2). These portions 12c and 13c are provided to retain the spring damper assemblies 20 within the openings 12b and 13b formed through the first and second cover plates 12 and 13 and within the openings 11c formed through the flange 11b of the hub 11.

Figure 3:
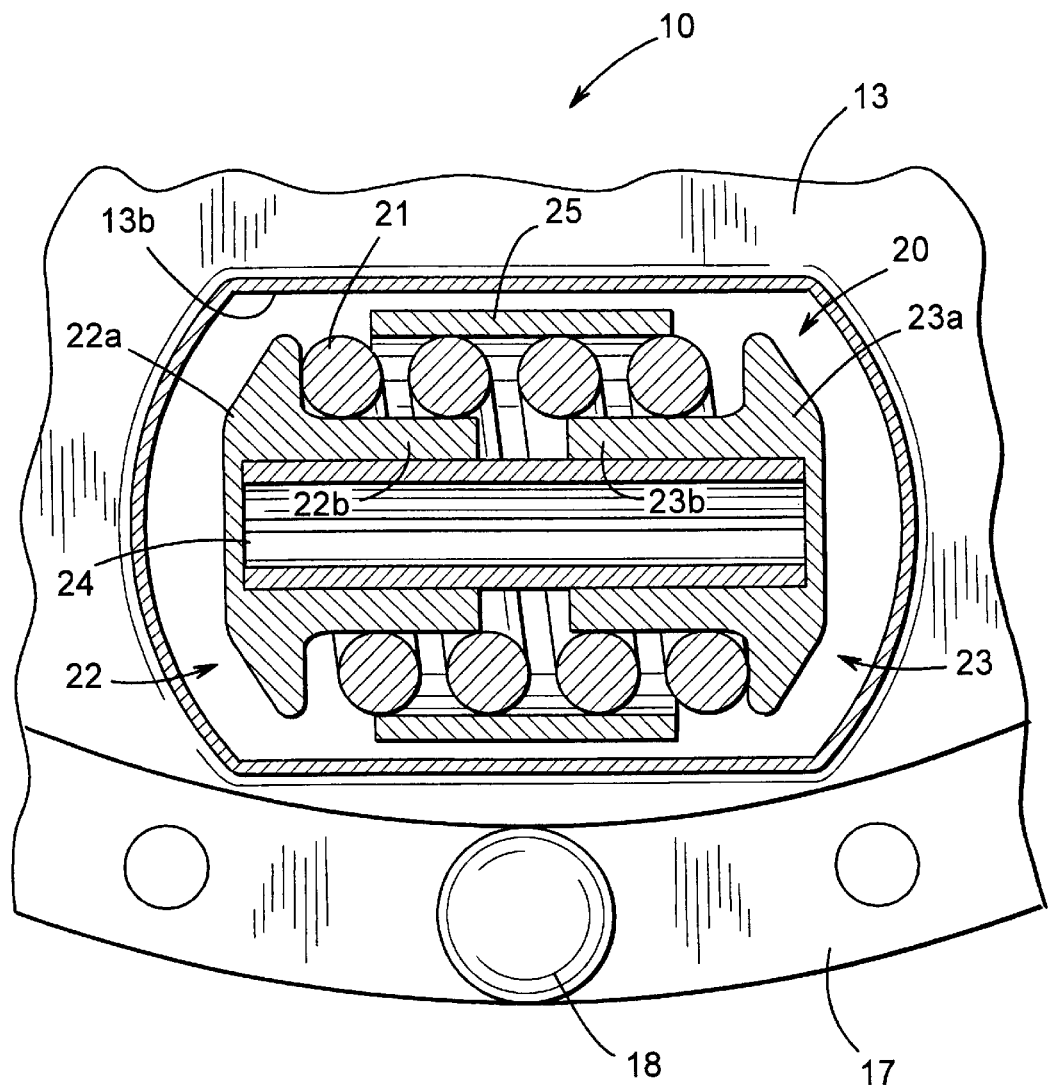
FIG. 3 is an enlarged front elevational view, partially in cross section, of a portion of the torsional vibration dampening assembly illustrated in FIG. 2.

As shown in FIG. 3, the spring damper assembly 20 has a relaxed axial length that is somewhat shorter than the axial length of the openings 12b and 13b formed through the first and second cover plates 12 and 13, respectively, and the openings 11c formed through the flange 11b of the hub 11. Thus, axial spaces exist between the end caps 22 and 23 and the adjacent axial ends of the openings 12b and 13b formed through the first and second cover plates 12 and 13, respectively, and the openings 11c formed through the flange 11b of the hub 11. The purpose for this axial spacing will be explained below.

The operation of the torsional vibration dampening assembly 10 will now be described. The first stage vibration damper 14 is provided to urge the first and second cover plates 12 and 13 toward a centered positioned relative to the flange 11b of the hub 11 at a relatively low spring rate. When the first and second cover plates 12 and 13 are in a centered positioned relative to the flange 11b of the hub 11, the openings 12b and 13b formed through the first and second cover plates 12 and 13, respectively, are axially aligned with the openings 11c formed through the flange 11b of the hub 11, such as shown in FIG. 3. As mentioned above, in this situation, axial spaces exist between the end caps 22 and 23 and the adjacent axial ends of the openings 12b and 13b formed through the first and second cover plates 12 and 13, respectively, and the openings 11c formed through the flange 11b of the hub 11.

However, when relatively small variations occur in the amount of torque that is being transmitted through the torsional vibration dampening assembly 10, such as when torque is transmitted through the torsional vibration dampening assembly 10, the resilient central damper element 14a of the first stage vibration damper 14 allows the first and second cover plates 12 and 13 to rotate as a unit relative to the flange 11b of the hub 11 to a limited extent, while continuing to transmit torque therethrough. The resilient central damper element 14a absorbs at least some of the relatively small variations in the amount of torque being transmitted through the torsional vibration dampening assembly 10, thereby reducing the amount of undesirable noise that otherwise might be generated. So long as the magnitude of this relative rotational movement remains relatively small, the end caps 22 and 23 of the second stage vibration damper will remain spaced apart from the axial ends of the openings 12b and 13b and the opening 11c and, therefore, have no effect on the operation of the torsional vibration dampening assembly 10.

If, however, the magnitude of this relative rotational movement increases as a result of an increase in the amount of torque being transmitted through the torsional vibration dampening assembly 10, the end caps 22 and 23 of the spring damper assembly 20 will eventually be engaged and compressed between the axial ends of the openings 12c and 13c on the one hand and the axial end of the opening 11c on the other hand. When this occurs, the spring 21 will become compressed, thus exerting a relatively large force that urges the first and second cover plates 12 and 13 back toward a centered positioned relative to the flange 11b of the hub 11 at a relatively high spring rate. In this manner, the spring damper assembly 20 functions as a second stage vibration damper, which becomes effective only for relatively large relative rotational movement between the first and second cover plates 12 and 13 and the flange 11b of the hub 11.

Throughout this entire operation, the isolation sleeves 25 are disposed between the springs 21 and the adjacent portions of the first and second cover plates 12 and 13. As a result, metal to metal contact therebetween is prevented, thus lowering the amount of noise that is generated during use of the torsional vibration dampening assembly 10.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A torsional vibration dampening assembly comprising:
   a first rotary torque transmitting element having an opening formed therethrough;
   a second rotary torque transmitting element having an opening formed therethrough, said second rotary torque transmitting element being connected to said first rotary torque transmitting element for rotation relative thereto; and
   a spring damper assembly disposed in said openings formed through said first and second rotary torque transmitting elements, said spring damper assembly including a movement restraining structure, first and second end caps having portions supported on said movement restraining structure for movement relative thereto, a resilient member disposed about said portions of said end caps and reacting between said first and second end caps, and an isolation sleeve disposed about said resilient member to prevent said resilient member from engaging said first and second rotary torque transmitting structures.

2. The torsional vibration dampening assembly defined in claim 1 wherein said first rotary torque transmitting element includes a hollow cylindrical hub having a splined inner surface.

3. The torsional vibration dampening assembly defined in claim 2 wherein said first rotary torque transmitting element further includes an annular flange extending about said hub, said opening being formed through said flange.

4. The torsional vibration dampening assembly defined in claim 1 wherein said second rotary torque transmitting element includes a cover plate having said opening formed therethrough.

5. The torsional vibration dampening assembly defined in claim 4 wherein said second rotary torque transmitting element includes a pair of cover plates that are secured together, each of said cover plates having an opening formed therethrough.

6. The torsional vibration dampening assembly defined in claim 1 further including a first stage vibration damper connected between said first rotary torque transmitting element and said second rotary torque transmitting element.

7. The torsional vibration dampening assembly defined in claim 6 wherein said first stage vibration damper includes an elastomeric element.

8. The torsional vibration dampening assembly defined in claim 1 wherein said resilient element is a coiled spring.

9. The torsional vibration dampening assembly defined in claim 1 wherein said isolation sleeve is formed from a relatively durable, low friction material.

10. The torsional vibration dampening assembly defined in claim 1 wherein said isolation sleeve is formed from nylon.

11. The torsional vibration dampening assembly defined in claim 1 wherein said first rotary torque transmitting element has a plurality of openings formed therethrough, said second rotary torque transmitting element has a plurality of openings formed therethrough that are respectively associated with said plurality of openings formed through said first rotary torque transmitting element, and a spring damper assembly is disposed in each of said associated openings formed through said first and second rotary torque transmitting element, each of said spring damper assemblies including a movement restraining structure, first and second end caps supported on said movement restraining structure for movement relative thereto, a resilient member reacting between said first and second end caps, and an isolation sleeve disposed about said resilient member to prevent said resilient member from engaging said first and second rotary torque transmitting structures.

* * * * *